United States Patent [19]

Sato et al.

[11] 4,219,003
[45] Aug. 26, 1980

[54] IGNITION MEANS FOR ROTARY PISTON ENGINES

[75] Inventors: Haruhiko Sato; Masao Shibagaki; Tadakazu Ueda, all of Hiroshima, Japan

[73] Assignee: Toyo Kogyo Co., Ltd., Hiroshima, Japan

[21] Appl. No.: 941,591

[22] Filed: Sep. 12, 1978

[30] Foreign Application Priority Data

Sep. 16, 1977 [JP] Japan .................. 52-112003
Sep. 22, 1977 [JP] Japan .................. 52-114150
Sep. 30, 1977 [JP] Japan .................. 52-118386
Oct. 15, 1977 [JP] Japan .................. 52-123872

[51] Int. Cl.² .................................. F02B 53/12
[52] U.S. Cl. ........................ 123/210; 123/169 EL; 313/138
[58] Field of Search ............. 123/210, 211, 169 R, 123/169 EL, 169 G, 169 MG; 313/118, 138, 141

[56] References Cited

U.S. PATENT DOCUMENTS

| | | | |
|---|---|---|---|
| 2,350,475 | 6/1944 | Rabezzana | 313/138 X |
| 3,155,085 | 11/1964 | Jones et al. | 123/210 X |
| 3,719,850 | 3/1973 | Schafer | 313/118 |
| 3,738,331 | 6/1973 | Braun et al. | 123/210 |
| 3,958,144 | 5/1976 | Franks | 313/138 |
| 3,996,900 | 12/1976 | Feierabend et al. | 123/210 |
| 4,028,576 | 6/1977 | Wofsey | 313/138 X |

Primary Examiner—Michael Koczo
Attorney, Agent, or Firm—Fleit & Jacobson

[57] ABSTRACT

Ignition plug for a rotary piston engine comprises a central electrode, an insulator disposed around the central electrode and having an end surface which defines a creeping discharge surface, and an outer electrode provided on an outer conductor. The outer electrode is radially inwardly projecting with respect to the radially inner surface of the conductor and has an axially and radially inward edge which is spaced apart from the insulator to provide an air gap for spark discharge and located flush with or axially outwardly of the end surface of the insulator.

4 Claims, 5 Drawing Figures

IGNITION MEANS FOR ROTARY PISTON ENGINES

The present invention relates to rotary piston engines and more particularly to ignition means for rotary piston engines. More specifically, the present invention pertains to ignition plugs for use in rotary piston engines.

In general, rotary piston engines include a casing which comprises a rotor housing having an inner wall surface of trochoidal configuration and a pair of side housings secured to the opposite sides of the rotor housing to define a rotor cavity of trochoidal cross-section. A rotor of substantially polygonal configuration is disposed in the rotor cavity for rotation with apex portions in sliding contact with the wall surface of the rotor housing. In this type of rotary piston engines, it is therefore necessary to locate ignition plugs in such a manner that they do not project into the cavity. For the purpose, the casing of the rotary piston engine is usually formed at the inner wall with bores for locating the ignition plugs with their end portions retreated from the inner wall surface of the casing.

In this type of rotary piston engines, problems have been experienced in that substantial amount of combustion gas is carried over, in idling operation, from the exhaust working chamber to the compression working chamber through the ignition plug bores and that the bores for the ignition plugs are not adequately scavenged. Further, in high speed, heavy load operation, charge of mixture in the compression working chamber is allowed to pass through the ignition plug bores into the exhaust working chamber resulting in a decrease in the engine output.

It has therefore been proposed by Japanese utility model publication Sho 49-36984 to eliminate the aforementioned problems by adopting so-called creeping discharge type ignition plugs which have an insulator including an end surface substantially flush with the end surface of the outer electrode.

It has further been proposed by Japanese patent application Sho 48-14368 which has been disclosed for public inspection on Nov. 28, 1973 under the disclosure No. Sho 48-91431 to provide ignition means by making use of creeping and air-gap discharge ignition plugs. This type of ignition plugs include a central or inner electrode, an insulator encircling said inner electrode and having an end surface which provides an insulative creeping discharge surface, and an outer electrode provided around the insulator with an air-gap discharge distance between the insulator and the outer electrode. This type of ignition plugs are considered as being advantageous in that the thermal capacity can be controlled by properly determining the dimension of the insulator as in conventional air-gap discharge type ignition plugs and that an increased discharge gap can be ensured and the overall structure can be simplified as in conventional creeping discharge type ignition plugs.

However, it has been experienced in the creeping and air-gap discharge type ignition plug that the end surface of the insulator is eroded by the discharge spark as the spark proceeds along the insulator end surface. Such erosion gradually progresses through a prolonged use of the ignition plug and there are formed radially extending grooves or channels of substantial depths because the sparks of discharge are apt to be produced only through the eroded channels since the conventional design is such that the required voltage for producing the discharge at the eroded channels is lower than that at portions where the erosions are not produced and that the inner edge of the outer electrode is apt to be displaced radially inwardly through possible wear of the outer electrode. Thus, as a result, the creeping discharge function is adversely affected.

It is therefore an object of the present invention to provide a creeping and air-gap discharge type ignition plug wherein erosion of the creeping discharge surface can be significantly suppressed.

Another object of the present invention is to provide a creeping and air-gap discharge type ignition plug which is so designed that discharge along eroded channels on the creeping discharge surface can be suppressed so as to prevent growth of the eroded channels.

A further object of the present invention is to provide a creeping and air-gap discharge type ignition plug which is effective to provide an improved ignition in idling and light load operation of a rotary piston engine.

According to the present invention, in order to accomplish the above and other objects, there is provided ignition means for rotary piston engines which comprises an ignition plug comprised of a central electrode, an insulator disposed around the central electrode and having an end surface which provides a creeping discharge surface, and an outer electrode provided on an outer conductor and positioned around the insulator with an airgap between said outer electrode and the insulator, said ignition plug being characterized by the fact that said outer electrode has an end surface which projects axially beyond the end surface of the insulator by a distance not exceeding 3 mm, said outer electrode being projecting radially inwardly from said outer conductor, said outer electrode having an axially and radially inner end located axially outwardly beyond the end surface of the insulator by a distance between 0 and 1.5 mm.

According to the above feature of the present invention, when the end surface of the insulator is eroded and channels are formed due to the discharge spark, the voltage required for producing a discharge at the eroded channels becomes higher than that at portions where the erosions are not produced. Therefore, the discharge is primarily produced along those portions where such channels do not exist. It is thus possible to prevent or suppress the growth of the channel on the insulator end surface.

According to a preferable aspect of the present invention, the outer electrode is formed with radially extending slit means so that the space between the insulator and the outer conductor can effectively be scavenged. Such slit means may comprise a plurality of slits having radially inward openings each of which is not less than 2 mm in width, the sum of the widths of the radially inward openings being 28 to 70% of circumferential length of a circle having a diameter equal to the distance between the inner periphery of the outer electrode and the center of the central electrode. It is further preferable that each of the aforementioned slits has a bottom which is inclined axially outwardly as viewed from the radially inward position.

The above and other objects and features of the present invention will become apparent from the following descriptions of preferred embodiments taking reference to the accompanying drawings, in which.

Figure 1:
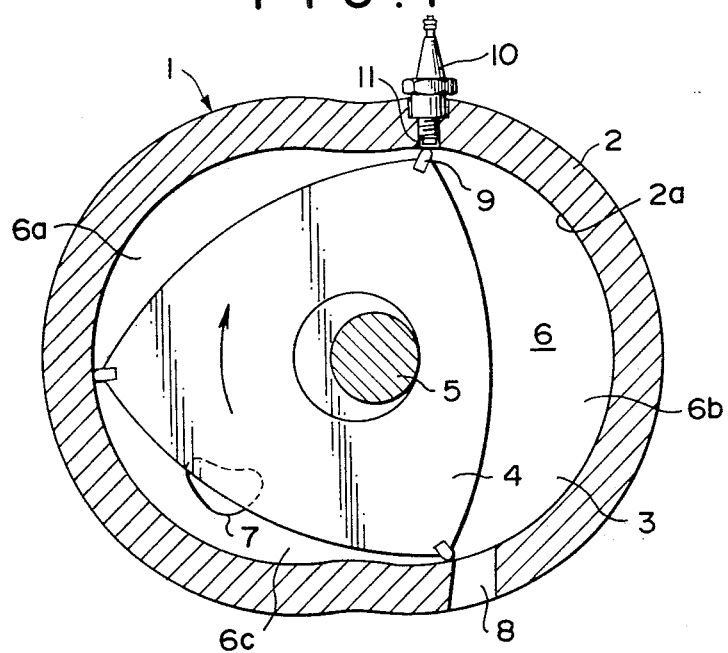
FIG. 1 is a sectional view of a rotary piston engine to which the ignition plug in accordance with the present invention can be applied.

Referring to the drawings, particularly to FIG. 1, there is shown a rotary piston engine comprising a casing 1 which is constituted by a rotor housing 2 having an inner wall surface 2a of a trochoidal configuration and a pair of side housings 3 which are secured to the opposite sides of the rotor housing 2. In the casing 1, there is disposed a substantially triangular rotor 4 which is carried by an eccentric shaft 5 and rotatable with apex seals 9 on its apex portions in sliding contact with the inner wall surface 2a of the rotor housing 2. Thus, working chambers 6 of variable volumes are defined by the inner wall surface 2a of the rotor housing 2 and flanks of the rotor 4. In the illustrated position of the rotor 4, the working chamber designated by the reference character 6a is in the compression stroke, while the chambers 6b and 6c are respectively in the exhaust and intake strokes. The side housing 3 of the casing 1 is formed with an intake port 7 which opens to the intake working chamber 6a, and the rotor housing 2 with an exhaust port 8 which opens to the exhaust working chamber 6b.

Figure 2:
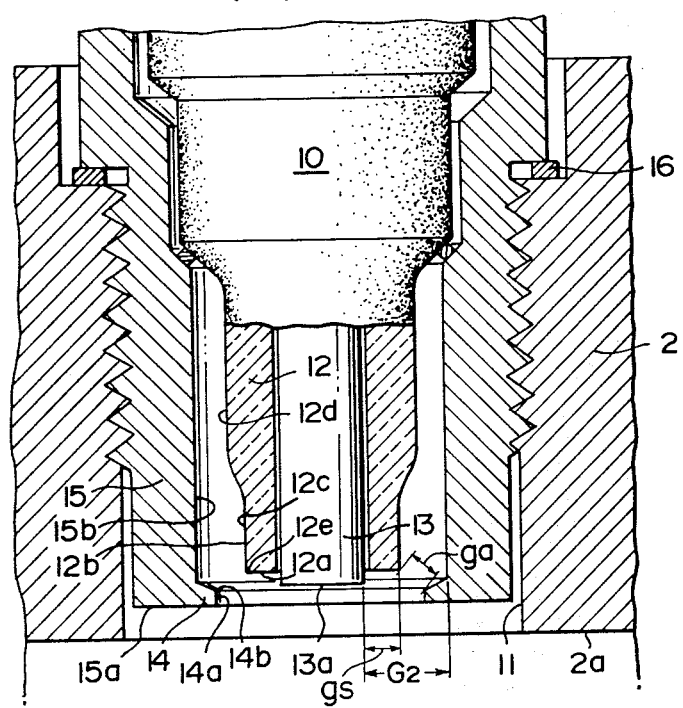
FIG. 2 is a sectional view showing an ignition plug in accordance with one embodiment of the present invention.
Figure 3:
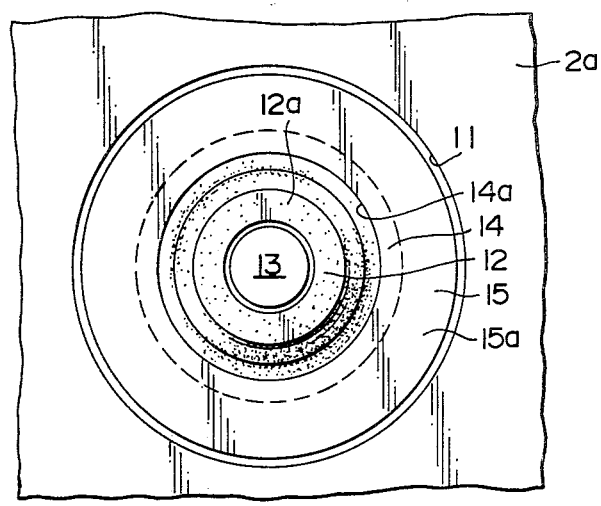
FIG. 3 is an end view of the ignition plug shown in FIG. 2.

The rotor housing 2 of the casing 1 is formed with an ignition plug bore 11 which opens to the compression working chamber. An ignition plug 10 is installed on the rotor housing 2 at the bore 11. Referring to FIGS. 2 and 3, the ignition plug 10 is comprised of a center electrode 13 encircled by an insulator 12 which has an end surface 12a and an outer surface 12b defined by a small diameter portion 12c. The insulator 12 is further formed with a large diameter portion 12d which is continuous with the small diameter portion 12c. In order to compensate for the difference in thermal expansion between the insulator 12 and the central electrode 13, there is provided a clearance of 0.2 to 0.3 mm between these two elements.

The central electrode 13 has an end surface 13a which projects beyond the end surface 12a of the insulator 12 by a distance between 0.5 and 1.0 mm. However, the end surface 13a of the central electrode 13 may be flush with the end surface 12a of the insulator 12.

Around the insulator 12, there is provided a conductor 15 which is formed at an end portion with an outer electrode 14. As shown in FIGS. 2 and 3, the outer electrode 14 is in the form of a radially inwardly projecting annular configuration having an inner surface 14a and a radially and axially inner edge 14b. The outer electrode 14 is located in such a manner that an air-gap (ga) is formed between the outer edge 12e of the outer surface 12b on the insulator 12 and the edge 14b of the outer electrode 14. Further, the end surface 12a of the insulator 12 provides a creeping discharge area (gs). Thus, a spark gap G is defined by the area gs and the air-gap ga.

The conductor 15 has an end surface 15a at the end adjacent to the outer electrode 14 and the end surface 15a is located so as to project beyond the end surface 12a of the insulator 12 by a distance not exceeding 3 mm. Where the distance is greater than this value, the end surface 12a is excessively retreated axially inwardly from the end of the ignition plug so that a space of an increased volume is left in the plug bore 11. Further, such arrangement causes a difficulty in scavenging the ignition plug.

In order to make it possible to locate the spark gap G as close as possible to the inner wall surface 2a of the rotor housing 2, it is preferable to dispose the end surface 15a of the conductor 15 flush with or slightly projected beyond the end surface 13a of the central electrode 13. From the viewpoint of protecting the end of the central electrode 13 against possible damage, it should preferably be retreated by a slight distance from the end surface 15a of the conductor 15.

The outer electrode 14 formed on the conductor 15 is projecting radially inwardly with respect to the inner surface 15b of the conductor 15 and the inner edge 14b is located with respect to the insulator end surface 12a axially outwardly by a distance of 0 to 1.5 mm. The outer electrode 14 is projected radially inwardly with respect to the inner surface 15b of the conductor 15 in such a manner that the voltage required for producing a discharge across the air gap between the insulator 12 and the outer electrode 14 is lower than that for producing a discharge across the air gap between the outer surface 12b of the insulator 12 and the inner surface 15b of the conductor 15 so that the discharge spark along the insulator end surface 12a is directed without fail toward the inner surface 14a of the outer electrode 14.

The aforementioned location of the inner edge 14b of the outer electrode is important because, when the insulator end surface 12a is eroded, the voltage required for producing a discharge between the eroded portion on the insulator 12 and the outer electrode 14 becomes greater than that required for producing a discharge between the outer electrode and the insulator end portion where the erosion is not produced, so that the discharge is apt to be produced only along such portion of the insulator end surface 12a where the erosion is not present. The arrangement is further advantageous in that wear of the outer electrode 14 is produced through a prolonged use of the ignition plug at the inner edge 14b so that the inner edge 14b is gradually displaced axially outwardly. Thus, even when the outer electrode 14 is worn, it is possible to maintain the discharge spark out of the eroded portion on the insulator end surface 12a.

If the axial distance between the insulator end surface 12a and the inner edge 14b of the outer electrode 14 is greater than 1.5 mm, the axial thickness of the electrode 14 becomes excessively small so that the life of the electrode 14 will be decreased. In a design where the aforementioned axial distance between the insulator end surface 12a and the electrode inner edge 14b is increased maintaining the air gap ga constant, the inner surface 14a of the electrode 14 is necessarily located very close to the central electrode 13 so that the space between the central electrode 13 and the outer electrode 14 must correspondingly be decreased. The results will then be that there will be a difficulty in scavenging the ignition plug and that there will be an increased possibility of misfire because the combustion flame is apt to grow in a relatively limited space and substantial part of heat is apt to be absorbed by the outer electrode. Thus, it is recommendable to maintain the aforementioned axial distance within 1.5 mm, preferably within 0.5 mm.

Referring now to the radial distance between the inner surface 14a of the outer electrode and the outer surface 12b of the insulator 12, it should be noted that the distance is important from the viewpoint of removal of carbon deposits. If the distance is too small, it becomes very difficult to remove carbon particles deposited on the inner surface 15b of the conductor 15 and the outer surface 12b of the insulator 12. Thus, the radial distance should not be less than 0.3 mm. Further, from the viewpoint of scavenging the space between the electrodes and facilitating growth of combustion flame, it is preferable to maintain the radial distance above 0.5 mm.

The ignition plug 10 constructed as described above is installed on the rotor housing 2 with its firing section located close to the inner wall surface 2a. More specifically, in a typical example, the end surface 13a of the central electrode 13 and/or the end surface 15a of the conductor 15 are located so that they are retreated from the inner wall surface 2a of the rotor housing 2 by a distance of 0.5 to 3.0 mm. The creeping discharge area gs may be of radial dimension of 0.6 to 1.4 mm and the air gap ga may be 0.7 to 1.4 mm.

With the air gap less than 0.7 mm, the air gap may often be clogged by carbon particles which may produce so called carbon bridges and cause misfiring. With the air gap greater than 1.4 mm, there will be no improvement in the ignition property in response to an increase in the air gap. Therefore, a recommendable range of the air gap ga is between 0.7 and 1.4 mm.

With the creeping discharge distance gs less than 0.6 mm, the life of the insulator 12 is significantly decreased. There will be no problem in respect of the life and the ignition property where the distance gs is greater than 0.6 mm, however, an increase in the creeping discharge distance gs requires an increased voltage for producing a discharge. Therefore, it is recommendable to maintain the creeping discharge distance gs between 0.6 and 1.4 mm.

Referring to the relationship between the creeping discharge distance gs and the air gap ga, it should be noted that the creeping discharge often becomes less contributable to ignition due to a contamination of the insulator surface and, in addition, even when there is no contamination, the discharge spark along the creeping discharge surface 12a is apt to be quenched by the surface. Therefore, the discharge spark along the surface 12a is less contributable to ignition than the spark across the air gap ga. It is thus preferable that the air gap ga be greater than the creeping discharge distance gs. For the purpose, it is recommendable to increase the space between the electrodes, and such increased space will also be effective in facilitating to scavenge the ignition plug and thus to improve the ignition property. It should further be noted that the overall spark gap G comprised of the creeping discharge distance gs and the air gap ga is so determined with respect to the air gap G2 between the central electrode 13 and the inner surface 15b of the conductor 15 that the voltage required for producing a discharge across the former gap G is less than that required for producing a discharge across the latter gap G2.

In installing the ignition plug 10 on the rotor housing 2, a gasket 16 may be positioned between the plug 10 and the rotor housing 2 so that the firing section of the plug 10 is properly positioned with respect to the inner wall surface 2a of the rotor housing 2. Such gasket 16 may be made of any suitable material such as copper or aluminum.

In operation, the discharge spark proceeds from the central electrode 13 along the creeping discharge surface 12a and across the air gap ga to the outer electrode 14 to ignite the air-fuel mixture existing in the vicinity of the spark gap. The combustion flame thus produced propagates toward the inside of the working chamber. Through the operation, the insulator end surface 12a may be eroded to some extent and grooves or channels may be formed due to the erosion. According to the present invention, however, the inner edge 14b of the outer electrode 14 is located flush with or axially outwards of the insulator end surface 12a so that the voltage required for producing a discharge along such channels is always higher than that required for producing a discharge along other portions on the surface 12a. Thus, the subsequent discharge is produced primarily along such other portions on the surface 12a. It is therefore possible to prevent the channels to grow further.

The outer electrode 14 may be worn at or around the inner edge 14b through a prolonged use of the plug 10. It should be noted, however, that such wear causes spark point on the electrode inner surface 14a to be displaced axially outwardly so that the voltage required for producing a discharge along such portions on the insulator end surface 12a wherein the channels are not formed is always lower than that required for producing a discharge along the channels. It is therefore possible to suppress growth of the channels.

In idling or light load operation of the engine wherein the mixture charging rate is comparatively low and there is a relatively large volume of residual gas with respect to the fresh charge of mixture, scavenging of the ignition plug can be satisfactorily performed in accordance with the present invention because the electrodes are positioned in the vicinity of the inner wall surface 2a of the rotor housing 2 and there is a relatively wide space between the central electrode and the outer electrode. The arrangement of the present invention is further considered as being advantageous in that the outer electrode 14 is in such a configuration that it does not disturb the growth of the combustion flame and ensures positive firing. Since the ignition plug bore 11 is substantially occupied by the plug 10, it is possible to decrease the amount of combustion gas which is allowed to flow from the exhaust working chamber to the compression working chamber through the plug bore when the apex seal between the working chambers is moving over the plug bore.

Figure 4:
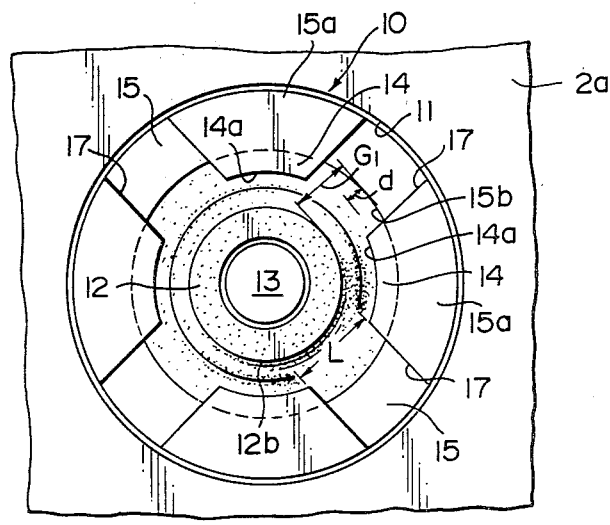
FIG. 4 is an end view similar to FIG. 3 but showing another embodiment of the present invention.

Referring now to FIG. 4 which shows another embodiment of the present invention, the ignition plug shown therein is substantially the same in structure as the plug shown and described with reference to FIGS. 2 and 3. Therefore, corresponding parts are designated in FIG. 4 by the same reference numerals as in FIGS. 2 and 3. In the embodiment shown in FIG. 4, the end portion of the conductor 15 is formed with radially extending straight slits 17 so that the outer electrode 14 is divided into four circumferentially spaced sections.

It has been found that the slits 17 provide improved results in scavenging the interior of the ignition plug 10. In order to obtain a desirable result, the width L of the inward opening of the slit 17 should preferably be greater than 2 mm and the sum of the widths L of the slits 17 be 28 to 70% of the circumferential length of a circle having a diameter equal to the distance between the inner periphery of the outer electrode 14 and the center of the central electrode 13.

In this arrangement, it is of course necessary to maintain the gap G1 between the outer surface 12b of the insulator 12 and the inner surface 15b of the conductor 15 greater than the air gap ga, which is formed between the outer edge of the outer surface 12b on the insulator 12 and the edge of the outer electrode 14 similar to the first embodiment, by a predetermined distance d. In this type of ignition plug, there is a tendency that carbon particles are deposited on the insulator end surface 12a on such portions that are facing to the slits 17. Therefore, the distance d must be determined in such a manner that a discharge spark will not be directed to the inner surface 15b of the conductor 15 even when carbon particles are deposited on the insulator end surface 12a as described above.

Figure 5:
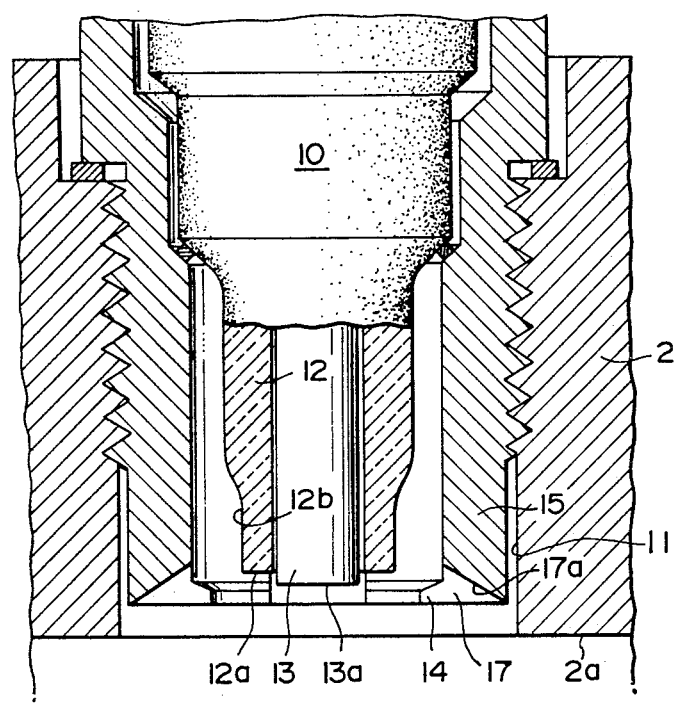
FIG. 5 is a sectional view similar to FIG. 2 but showing a further embodiment of the present invention.

Referring to FIG. 5, there is shown an ignition plug in accordance with another embodiment of the present invention. In this embodiment, the slit 17 has a bottom 17a which is inclined axially outwardly as seen from the radially inner side. It has been found that the inclined bottom 17a of the tapered slits 17 provides a further improved scavenging effect.

The invention has thus been shown and described with reference to specific embodiments, however, it should be noted that the invention is in no way limited to the details of the illustrated structures but changes and modifications may be made without departing from the scope of the appended claims.

We claim:

1. A rotary piston engine comprising a casing which includes a rotor housing having a trochoidal inner wall surface and a pair of side housings attached to the opposite sides of the rotor housing; a substantially polygonal rotor disposed in the casing for rotation with apex portions in sliding contact with the inner wall surface of the rotor housing; ignition means which comprises an ignition plug comprised of a central electrode, an insulator disposed around the central electrode and having an end surface which provides a surface gap for creeping discharge, an outer conductor provided around the insulator, and an outer electrode provided on said outer conductor at an end adjacent to the end surface of the insulator so as to project radially inwardly from said outer conductor to be positioned around the insulator with an air-gap between said outer electrode and the insulator; said air-gap being contiguous with said surface gap to provide a discharge end together with said surface gap, said discharge end being located adjacent to the inner wall surface of the rotor housing, said outer electrode having an end surface which projects axially beyond the end surface of the insulator by a distance not exceeding 3 mm, said outer electrode having an axially and radially inwardly extending inner end located axially outwardly beyond the end surface of the insulator by a distance between 0 and 1.5 mm, said outer electrode being formed for facilitating scavenging of the space between the insulator and the outer conductor with radially extending slit means which comprises a plurality of slits having radially inward openings, each of which is not less than 2 mm in width, the sum of the widths of the radially inward openings being 28 to 70% of the circumferential length of a circle having a diameter equal to the distance between the inner periphery of the outer electrode and the center of the central electrode.

2. Ignition means in accordance with claim 1 in which said creeping discharge surface has a radial distance which is smaller than said air gap.

3. Ignition means in accordance with claim 1 in which said slit means has bottom means which is inclined axially outwardly as viewed from a radially inward portion.

4. Ignition means in accordance with claim 1 in which said central electrode has an end which projects beyond the end surface of the insulator but is axially retreated from the end surface of the outer electrode.

* * * * *